(12) United States Patent
Huang et al.

(10) Patent No.: US 8,289,705 B2
(45) Date of Patent: Oct. 16, 2012

(54) ELECTRONIC DEVICE

(75) Inventors: Hsiao-Chuan Huang, Taoyuan County (TW); Yi-Bin Ho, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 279 days.

(21) Appl. No.: 12/504,938

(22) Filed: Jul. 17, 2009

(65) Prior Publication Data
US 2010/0020480 A1    Jan. 28, 2010

(30) Foreign Application Priority Data
Jul. 25, 2008 (TW) ............................... 97128313 A

(51) Int. Cl.
*G06F 1/16* (2006.01)
*H05K 5/00* (2006.01)
*H05K 7/00* (2006.01)

(52) U.S. Cl. ............. 361/679.56; 455/575.3; 455/575.4; 361/679.3; 361/679.58

(58) Field of Classification Search ............. 361/679.02, 361/679.04, 679.06, 679.21, 679.27, 679.3, 361/679.55, 679.56, 679.58; 455/575.1–575.4
See application file for complete search history.

(56) References Cited

U.S. PATENT DOCUMENTS

| | | | | |
|---|---|---|---|---|
| 5,416,730 A | * | 5/1995 | Lookofsky | 361/679.09 |
| 6,366,440 B1 | * | 4/2002 | Kung | 361/147 |
| 7,269,450 B2 | * | 9/2007 | Lee et al. | 455/575.1 |
| 7,346,375 B2 | * | 3/2008 | Sato et al. | 455/575.3 |
| 7,353,049 B2 | * | 4/2008 | Mizuta | 455/575.3 |
| 7,507,044 B2 | * | 3/2009 | Kemppinen | 400/489 |
| 2004/0127266 A1 | * | 7/2004 | Aagaard et al. | 455/575.1 |
| 2005/0005400 A1 | * | 1/2005 | Park et al. | 16/367 |
| 2005/0020325 A1 | * | 1/2005 | Enger et al. | 455/575.3 |
| 2005/0078443 A1 | * | 4/2005 | Lee et al. | 361/683 |
| 2005/0128695 A1 | * | 6/2005 | Han | 361/683 |
| 2005/0137000 A1 | | 6/2005 | Toh et al. | |
| 2005/0210629 A1 | * | 9/2005 | Seidler et al. | 16/320 |
| 2006/0183369 A1 | | 8/2006 | Park | |
| 2007/0065220 A1 | * | 3/2007 | Kemppinen | 400/682 |
| 2007/0121303 A1 | * | 5/2007 | Wang et al. | 361/752 |
| 2007/0123309 A1 | * | 5/2007 | Sano et al. | 455/566 |
| 2007/0277349 A1 | * | 12/2007 | Yu | 16/320 |
| 2008/0076479 A1 | | 3/2008 | Nagamine et al. | |
| 2008/0146295 A1 | | 6/2008 | Jorgensen et al. | |
| 2008/0304217 A1 | * | 12/2008 | Lai et al. | 361/681 |

FOREIGN PATENT DOCUMENTS

| | | |
|---|---|---|
| EP | 1 484 900 | 12/2004 |
| WO | WO-2006/034949 | 4/2006 |
| WO | WO-2007/034283 | 3/2007 |

* cited by examiner

*Primary Examiner* — Adrian S Wilson
(74) *Attorney, Agent, or Firm* — Birch, Stewart, Kolasch & Birch, LLP

(57) ABSTRACT

An electronic device is provided, including a first module, a second module, a control module, and a torsion hinge. The second module is rotatably disposed on the first module between a first position and a second position. The control module is slidably disposed on the first module between a third position and a fourth position. When the control module is in the third position, the second module is restricted to rotate with respect to the first module. When the control module is in the fourth position, the second module is released by the control module and rotatable with respect to the first module.

13 Claims, 6 Drawing Sheets

ELECTRONIC DEVICE

CROSS REFERENCE TO RELATED APPLICATIONS

This Application claims priority of Taiwan Patent Application No. 097128313, filed on Jul. 25, 2008, the entirety of which is incorporated by reference herein.

BACKGROUND OF THE INVENTION

1. Field of the Invention

The application relates in general to an electronic device and in particular to an electronic device having a torsion hinge which can automatically open a display module or a keypad module thereof.

2. Description of the Related Art

Conventional sliding-type electronic devices usually include a keypad module and a display module reciprocally movable with respect to each other. When the electronic device is not in use, the keypad module and the display module overlap. When using the electronic device, the user has to hold the electronic device tightly and push the display module outwardly, such that the keys on the keypad module are exposed to be viewed.

In some critical circumstances, operation of the conventional sliding-type electronic device is complicated and not user-friendly. Hence, mechanical design for rapid and convenient operation of the sliding-type electronic device has become a critical issue.

BRIEF SUMMARY OF INVENTION

The application provides an electronic device including a first module, a second module, a control module, and a torsion hinge. The second module is rotatably disposed on the first module between a first position and a second position. The control module is slidably disposed on the first module between a third position and a fourth position. When the control module is in the third position, the second module is restricted to rotate with respect to the first module. When the control module is in the fourth position, the second module is released by the control module and rotatable with respect to the first module.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
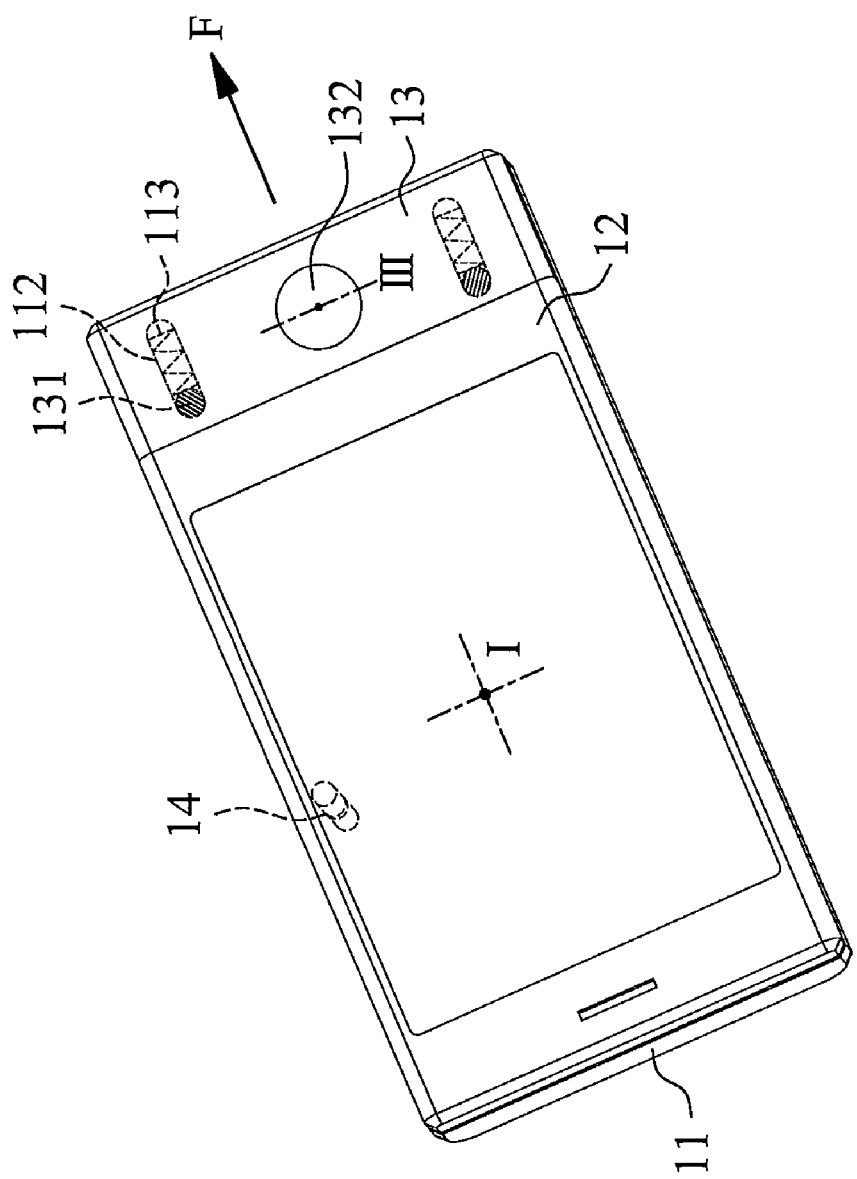
FIG. 1 is a perspective diagram of an electronic device having a second module situated in a first position according to a first embodiment of the invention.
Figure 2:
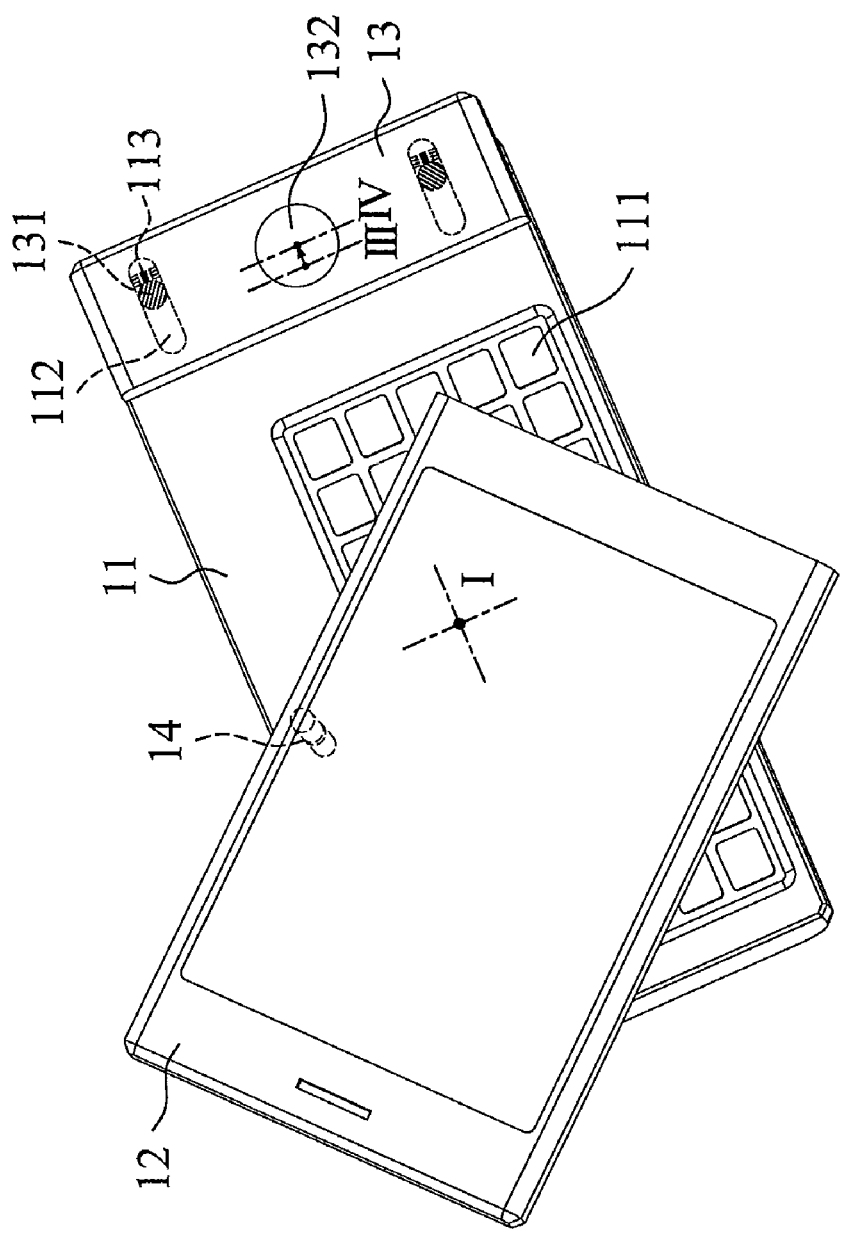
FIG. 2 is a perspective diagram of the second module rotating with respect to a first module of the electronic device according to the first embodiment of the invention.
Figure 3:
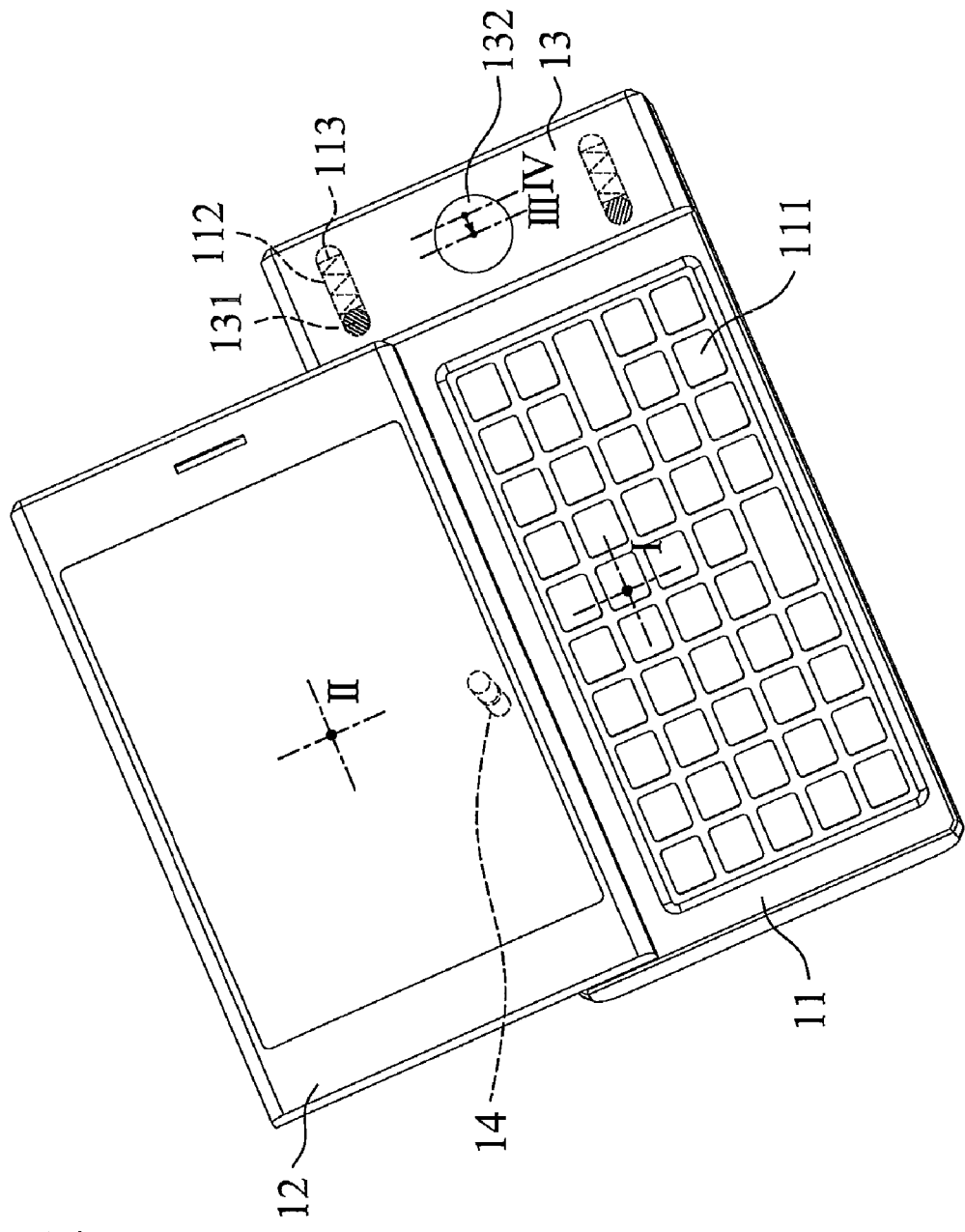
FIG. 3 is a perspective diagram of a second module rotating to a second position with respect to the first module of the electronic device according to the first embodiment of the invention.

Referring to FIGS. 1-3, an electronic device 10 according to a first embodiment of the present invention includes a first module 11, a second module 12, a control module 13, and a torsion hinge 14. When the electronic device 10 is not in use, as shown in FIG. 1, the control module 13 is in a third position III, and the second module 12 is restricted in a first position and completely covers a keypad 111 of the first module 11.

When using the electronic device 10, the user can apply a force F on the control module 13 (as shown in FIG. 1), so that the control module 13 is moved from the third position III to a fourth position IV (as shown in FIG. 2). Subsequently, the second module 12 is rotated 180 degrees by the torsion hinge 14 from the first position I to the second position II, and the keypad 111 of the first module 11 is exposed to be viewed, as shown in FIG. 3.

The second module 12 is rotatably disposed on the first module 11 between a first position I and a second position II, and the torsion hinge 14 pivotally connects the first and second module 12. The control module 13 is disposed adjacent to the second module 12 and slidably connected to the first module 11 between a third position III and a second position IV.

The first module 11 includes a keypad 111, a slot 112, and a spring 113 received in the slot 112. The control module 13 has a slider 131 received in the slot 112 and connected to the spring 113. When using the electronic device 10, the user can apply a force F (as shown in FIG. 1) on the control module 13. Hence, the control module 13 is moved from the third position III to the fourth position IV, as shown in FIG. 2, wherein the slider 13 slides along the slot 112 and compresses the spring 113. When the force F is released, the control module 13 returns from the fourth position IV to the third position III along the slot 112 by a recovery force of the spring 131, as shown in FIG. 3. In this embodiment, the control module 13 further has a control button 132 to control the electronic device 10.

With respect to FIGS. 1-3, the slot 112 and the spring 113 are disposed on the first module 11, and the slider 131 is disposed on the control module 13. In some embodiments, the slot 112 and the spring 113 may be disposed on the control module 13, and correspondingly, the slider 131 may be disposed on the first module 11, thus providing the same function as the mechanism shown in FIGS. 1-3.

The first module 11 in this embodiment is a keypad module, and the second module 12 is a display module. However, the first module 11 may be a display module, and the second module 12 may be a keypad module. In some embodiments, both of the first and second modules 11 and 12 may be display modules, wherein the first module 11 is provided to display a virtual keypad.

As aforementioned, the electronic device 10 includes a first module 11, a second module 12 rotatably disposed on the first module 11, a control module 13 slidably disposed on the first module 11, and a torsion hinge 14 pivotally connecting the first and second modules 11 and 12. During usage, the user can hold the electronic device 10 with one hand and push the control module 13, such that the second module 12 automatically rotates to expose the keypad 111 of the first module 11. Hence, rapid and convenient operation of the electronic device is achieved even when in critical circumstances.

Figure 4:
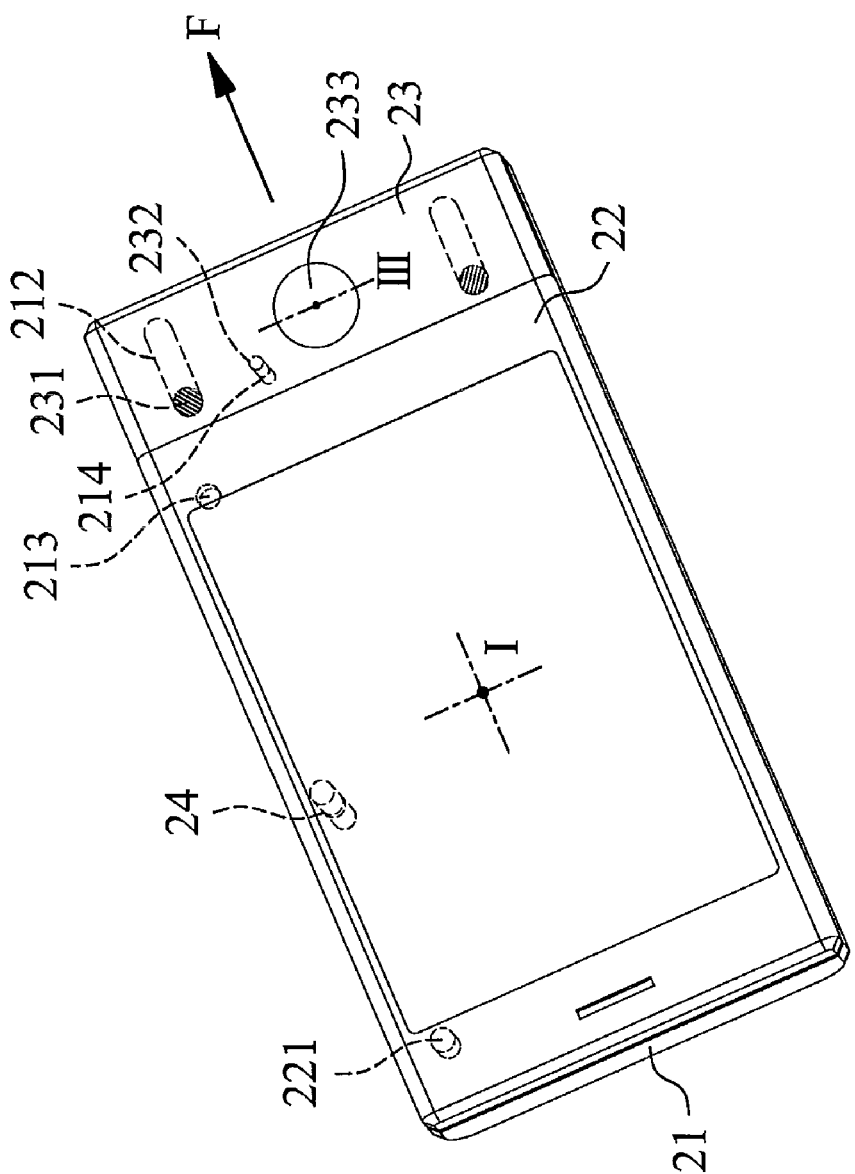
FIG. 4 is a perspective diagram of an electronic device having a second module situated in a first position according to a second embodiment of the invention.
Figure 5:
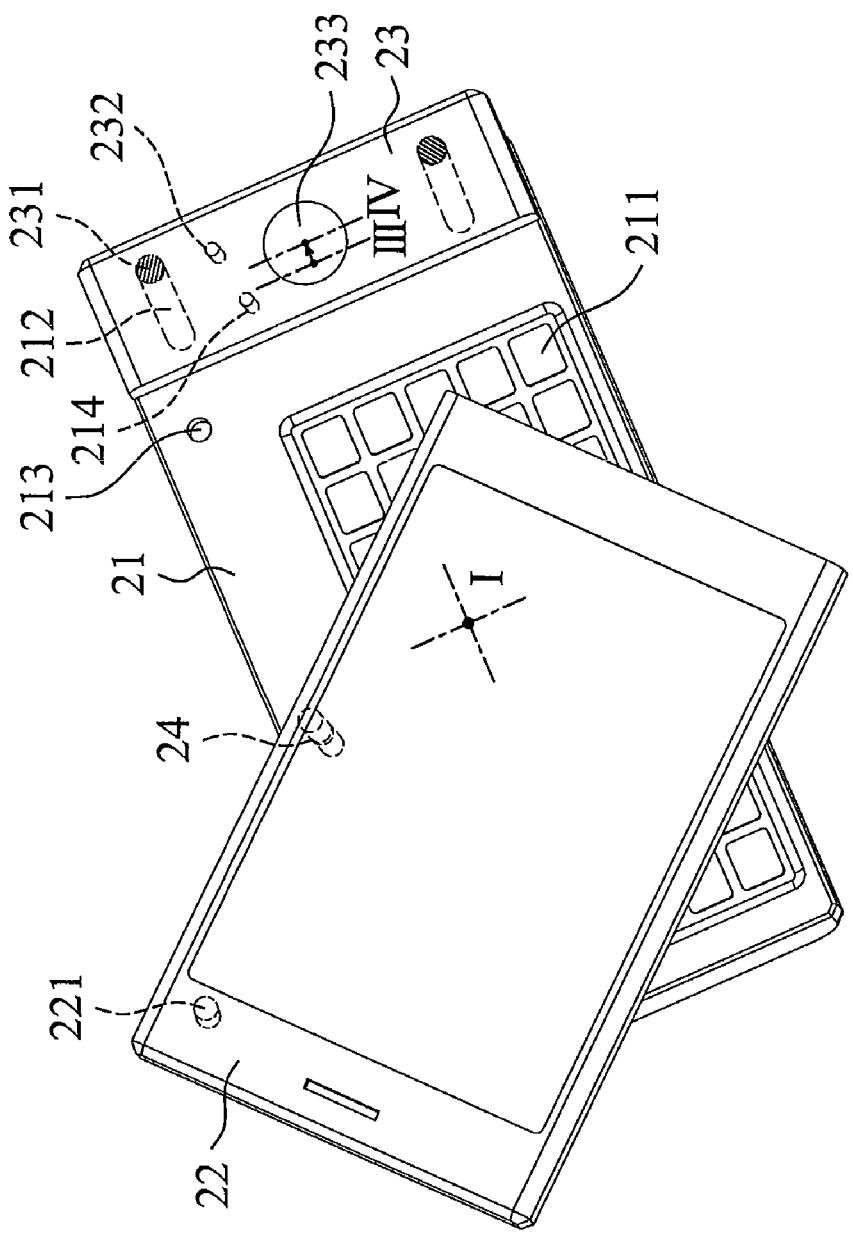
FIG. 5 is a perspective diagram of the second module rotating with respect to a first module of the electronic device according to the second embodiment of the invention.
Figure 6:
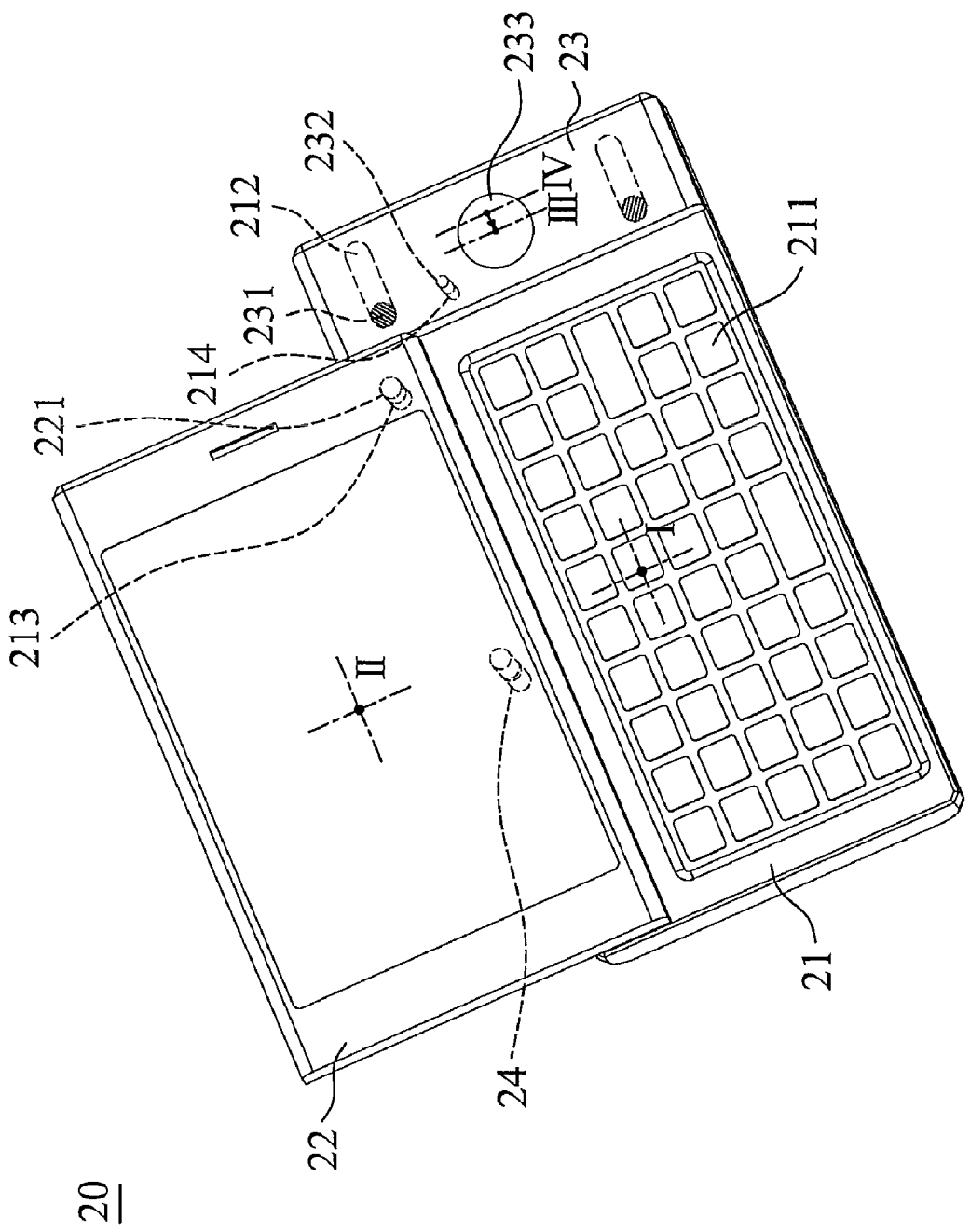
FIG. 6 is a perspective diagram of the second module rotating to a second position with respect to the first module of the electronic device according to the second embodiment of the invention.

FIGS. 4-6 depict an electronic device 20 according to a second embodiment of the present invention. In this embodiment, when a control module 30 is pushed, a second module 22 of the electronic device 20 automatically rotates up by a torsion hinge 24. As shown in FIGS. 4-6, the electronic device 20 includes a first module 21, a second module 22, a control module 23, and a torsion hinge 24. The second module 22 is rotatably disposed on the first module 21 between a first position I and a second position II. The control module 23 is disposed adjacent to the second module 22 and slidably connected to the first module 21 between a third position III and a fourth position IV.

The first module 21 includes a keypad 211, a slot 212, a first magnetic element 213, and a second magnetic element 214. The second module 22 includes a third magnetic element 221. The control module 23 includes a fourth magnetic element 232 and a slider 231 received in the slot 212. In this embodiment, the first and third magnetic elements 213 and 221 are coupled and magnetically attracted to each other. Similarly, the second and fourth magnetic elements 214 and 232 are coupled and magnetically attracted to each other.

As shown in FIG. 4, when the control module 23 is in the third position III, at least a part of the second and fourth magnetic elements 214 and 232 overlap and are fixed by magnetic attraction. In this embodiment, the second and fourth magnetic elements 214 and 232 completely overlap to enhance magnetic attraction thereof. In some embodiments, the second and fourth magnetic elements 214 and 232 may be spaced apart with adequate magnetic attraction provided therebetween when the control module 23 is in the third position III, so as to restrict relative position between the control module 23 and the first module 21.

In this embodiment, the slot 212 is disposed on the first module 21, and the slider 231 is disposed on the control module 23. In some embodiments, the slot 212 may be disposed on the control module 23, and correspondingly, the slider 231 may be disposed on the first module 21. When the control module 23 moves between the third and fourth positions III and IV, the slider 231 slides along the slot 212.

When using the electronic device 20, the user applies a force F (as shown in FIG. 4) on the control module 23, so as to move the control module 13 from the third position III to the fourth position IV (as shown in FIG. 5), wherein the slider 231 slides along the slot 212 to release the second module 22. Subsequently, the torsion hinge 24 applies a torque on the second module 22 to rotate 180 degrees from the first position I to the second position II (as shown in FIG. 6). As shown in FIG. 6, when the second module 22 is in the second position II, at least a part of the first magnetic element 213 and the third magnetic element 221 overlap and are fixed by magnetic attraction, so as to restrict position of the second module 22 in the second position II.

When the force F is released, the slider 231 slides along the slot 212 by magnetic attraction between the second and fourth magnetic elements 214 and 232, such that the control module 23 automatically returns from the fourth position IV to the third position III (as shown in FIG. 6). In this embodiment, the control module 23 further has a control button 232 to control the electronic device 20.

Referring to FIGS. 4-6, the slot 212 is disposed on the first module 21, and the slider 231 is disposed on the control module 23. In some embodiments, the slot 212 may be disposed on the control module 23, and the slider 231 may be disposed on the first module 21, thus providing the same function as the mechanism shown in FIGS. 4-6.

In this embodiment, the first module 21 is a keypad module, and the second module 22 is a display module. However, the first module 21 may be a display module, and the second module 22 may be a keypad module. In some embodiments, the first and second modules 21 and 22 are both display modules, wherein the first module 21 can display a virtual keypad.

The present application provides an electronic device including a first module, a second module rotatably disposed on the first module, a control module slidably disposed on the first module, and a torsion hinge pivotally connecting the first and second modules. The electronic device may be a portable electronic device such as mobile phone or personal digital assistant (PDA). During usage, the user can hold the electronic device with one hand and push the control module, such that the second module automatically rotates to expose the first module. Hence, rapid and convenient operation of the electronic device is achieved even when critical circumstances occur.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a first module,
   a second module, rotatably disposed on the first module between a first position and a second position; and
   a control module, adjacent to the second module and slidably disposed on the first module between a third position and a fourth position, wherein the second module is restricted to rotate when the control module is in the third position, and the second module is released by and separated from the control module and automatically rotates from the first position to the second position after the control module moves from the third position by an external force,
   wherein the control module is partially slid out of the first module after the control module moves from the third position.

2. The electronic device as claimed in claim 1, wherein the first module comprises a keypad entirely covered by the second module when the second module is in the first position, and the keypad is exposed to be viewed when the second module rotates to the second position.

3. The electronic device as claimed in claim 1, wherein the second module with respect to the first module rotates 180 degrees from the first position to the second position.

4. The electronic device as claimed in claim 1, wherein the electronic device further comprises a torsion hinge pivotally connecting the first and second modules.

5. The electronic device as claimed in claim 1, wherein the first module comprises a slot, the control module comprises a slider received in the slot, and the slider slides along the slot when the control module moves between the third and fourth positions.

6. The electronic device as claimed in claim 5, wherein the first module comprises a spring received in the slot and connected to the slider.

7. The electronic device as claimed in claim 5, wherein the first module further comprises a first magnetic element, and the control module further comprises a second magnetic element, wherein at least a part of the first and second magnetic elements overlap and are fixed by magnetic attraction when the control module is in the third position.

8. The electronic device as claimed in claim 1, wherein the control module comprises a slot, the first module comprises a slider received in the slot, the slider slides along the slot when the control module moves between the third and fourth positions.

9. The electronic device as claimed in claim 8, wherein the control module further comprises a spring received in the slot and connected to the slider.

10. The electronic device as claimed in claim 8, wherein the first module further comprises a first magnetic element, and the control module further comprises a second magnetic element, wherein at least a part of the first and second magnetic elements overlap and are fixed by magnetic attraction when the control module is in the third position.

11. The electronic device as claimed in claim 1, wherein the first module further comprises a first magnetic element, and the second module comprises a second magnetic element, wherein at least a part of the first and second magnetic elements overlap and are fixed by magnetic attraction when the second module rotates to the second position.

12. The electronic device as claimed in claim 1, wherein the first module is a keypad module, and the second module is a display module.

13. The electronic device as claimed in claim 1, wherein the first and second modules are display modules.

* * * * *